United States Patent
Cheng

(10) Patent No.: US 9,043,441 B1
(45) Date of Patent: May 26, 2015

(54) METHODS AND SYSTEMS FOR PROVIDING NETWORK CONTENT FOR DEVICES WITH DISPLAYS HAVING LIMITED VIEWING AREA

(75) Inventor: Luciano Ming-Luay Cheng, New York, NY (US)

(73) Assignee: Google Inc., Mountain View, CA (US)

( * ) Notice: Subject to any disclaimer, the term of this patent is extended or adjusted under 35 U.S.C. 154(b) by 200 days.

(21) Appl. No.: 13/495,482

(22) Filed: Jun. 13, 2012

Related U.S. Application Data

(60) Provisional application No. 61/652,680, filed on May 29, 2012.

(51) Int. Cl.
G06F 3/00 (2006.01)
G06F 3/0481 (2013.01)

(52) U.S. Cl.
CPC .................... *G06F 3/0481* (2013.01)

(58) Field of Classification Search
USPC ............................ 709/201–203, 219; 715/744
See application file for complete search history.

(56) References Cited

U.S. PATENT DOCUMENTS

| | | | |
|---|---|---|---|
| 6,300,947 B1 * | 10/2001 | Kanevsky | 715/866 |
| 6,704,798 B1 * | 3/2004 | Mogul | 709/246 |
| 7,823,083 B2 | 10/2010 | Rohrabaugh et al. | |
| 8,130,201 B1 * | 3/2012 | Arnold et al. | 345/169 |
| 2002/0120721 A1 * | 8/2002 | Eilers et al. | 709/220 |
| 2008/0195692 A1 * | 8/2008 | Hayosh et al. | 709/202 |
| 2008/0201452 A1 * | 8/2008 | Athas et al. | 709/219 |
| 2009/0265611 A1 * | 10/2009 | Sengamedu et al. | 715/234 |
| 2010/0017502 A1 * | 1/2010 | Cheng et al. | 709/219 |
| 2010/0199197 A1 | 8/2010 | Faletski et al. | |
| 2010/0211893 A1 | 8/2010 | Fanning et al. | |
| 2011/0016403 A1 | 1/2011 | Shibukawa et al. | |
| 2011/0078593 A1 | 3/2011 | Matsui | |
| 2011/0113090 A1 * | 5/2011 | Peeri | 709/203 |
| 2011/0167333 A1 * | 7/2011 | Sakata | 715/234 |
| 2012/0011446 A1 * | 1/2012 | Harvin et al. | 715/744 |
| 2012/0192063 A1 * | 7/2012 | Koren et al. | 715/252 |

* cited by examiner

*Primary Examiner* — Shirley Zhang
(74) *Attorney, Agent, or Firm* — Troutman Sanders LLP; James E. Schutz; Christopher W. Glass

(57) ABSTRACT

A server computer can generate and provide network content that is displayed on computing devices, such as mobile phones or tablets, which include displays with limited viewing area. When a computing device with a display, which has a limited viewing area, is detected, a mobile version of the content, such as a webpage, is automatically generated at the time the request is received. The mobile version is generated by identifying known features in the content and modifying the known features so they are compatible with the display, which has limited viewing area, without removing information and content.

22 Claims, 4 Drawing Sheets

METHODS AND SYSTEMS FOR PROVIDING NETWORK CONTENT FOR DEVICES WITH DISPLAYS HAVING LIMITED VIEWING AREA

CROSS-REFERENCE TO RELATED APPLICATIONS

This application claims priority to U.S. Provisional Patent Application Ser. No. 61/652,680 filed on May 29, 2012, the disclosure of which is incorporated in its entirety by reference herein.

TECHNICAL FIELD

This disclosure relates generally to method and system for providing content over a network.

BACKGROUND

Today, users are utilizing devices with smaller displays, e.g. mobile phones, to view content on the Internet, such as websites and webpages. Webpages, however, are typically designed to be viewed by desktop computers having standard sized display. Currently, to provide webpages to mobile devices with limited computing power and displays with limited viewing area, the webpages are modified to remove content from the webpages. For example, the webpage may be transcoded before providing the webpage to a mobile device. Transcoding is the process of stripping out as much content, e.g. HTML/CSS/Javascript, as possible to make content viewable on mobile devices. Also, in many cases, authors and owners of a website will re-create a mobile version of a website, which contains less content than the desktop version. This requires the author or owner to edit the website to remove content. Additionally, the mobile version must be separately hosted and referenced (or redirected) with a separate address from the desktop version.

In both cases, the webpages, modified for limited viewing area displays, do not provide the same experience because content is removed. Likewise, the author or owner must expend significant time redesigning webpages for devices with limited viewing area displays. Accordingly, there is a need for systems and processes that provide webpages to devices with limited viewing area displays, which does not burden the owners or authors of the webpages and preserves the content of the webpages.

SUMMARY

Embodiments of the present teachings relate to a method for providing content to computing devices. The method includes receiving, at a server computer from a mobile computing device, a request to provide a webpage. The method also includes identifying, from the request, that the mobile computing device includes a display with limited viewing area to display the webpage. Further, the method includes identifying a predefined feature contained in the webpage that would not properly display on the display, and includes modifying the predefined feature for a mobile version of the webpage, wherein the predefined feature of the mobile version retains content contained in the predefined feature of an original version of the webpage. Additionally, the method includes generating, at the server computer after receiving the request, the mobile version of the webpage that is formatted for the display of the mobile computing device. The method also includes providing the mobile version of the webpage to the mobile computing device.

Embodiments of the present teachings relate to a system for providing content to computing devices. The system includes a memory storing instructions and a one or more processors coupled to the memory and configured to execute the instructions to perform a method. The method includes receiving, from a mobile computing device, a request to provide a webpage. The method also includes identifying, from the request, that the mobile computing device includes a display with limited viewing area to display the webpage. Further, the method includes identifying a predefined feature contained in the webpage that would not properly display on the display, and includes modifying the predefined feature for a mobile version of the webpage, wherein the predefined feature of the mobile version retains content contained in the predefined feature of an original version of the webpage. Additionally, the method includes generating, after receiving the request, the mobile version of the webpage that is formatted for the display of the mobile computing device. The method also includes providing the mobile version of the webpage to the mobile computing device.

Embodiments of the present teachings relate to a computer readable storage medium comprising instructions that cause one or more processors to perform a method. The method includes receiving, at a server computer from a mobile computing device, a request to provide a webpage. The method also includes identifying, from the request, that the mobile computing device includes a display with limited viewing area to display the webpage. Further, the method includes identifying a predefined feature contained in the webpage that would not properly display on the display, and includes modifying the predefined feature for a mobile version of the webpage, wherein the predefined feature of the mobile version retains content contained in the predefined feature of an original version of the webpage. Additionally, the method includes generating, at the server computer after receiving the request, the mobile version of the webpage that is formatted for the display of the mobile computing device. The method also includes providing the mobile version of the webpage to the mobile computing device.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the present teachings are described by referring mainly to example of various embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific example of the various embodiments. Electrical, mechanical, logical and structural changes can be made to the example of the various embodiments without departing from the spirit and scope of the present teachings. The following detailed description is, therefore, not to be taken in a limiting sense and the scope of the present teachings is defined by the appended claims and their equivalents.

Embodiments of the present disclosure are related to systems and methods for generating and providing network content that is displayed on computing devices, such as mobile phones or tablets, which include displays with limited viewing area. According to embodiments, when a computing device with a display which has a limited viewing area is detected, a mobile version of the content, such as a webpage, is automatically generated at the time the request is received. The mobile version is generated by identifying known features in the content and modifying the known features so they are compatible with the display, which has limited viewing area, without removing content.

As such, content can be provided which is customized for the computing device requesting the content based on the ability of the computing device to display the content. Likewise, by utilizing the known features in the content and generating the mobile version at the time of the request, an author or administrator can enable the generation of the mobile version of the content without redesigning or recreating a separate version of the content.

Figure 1:
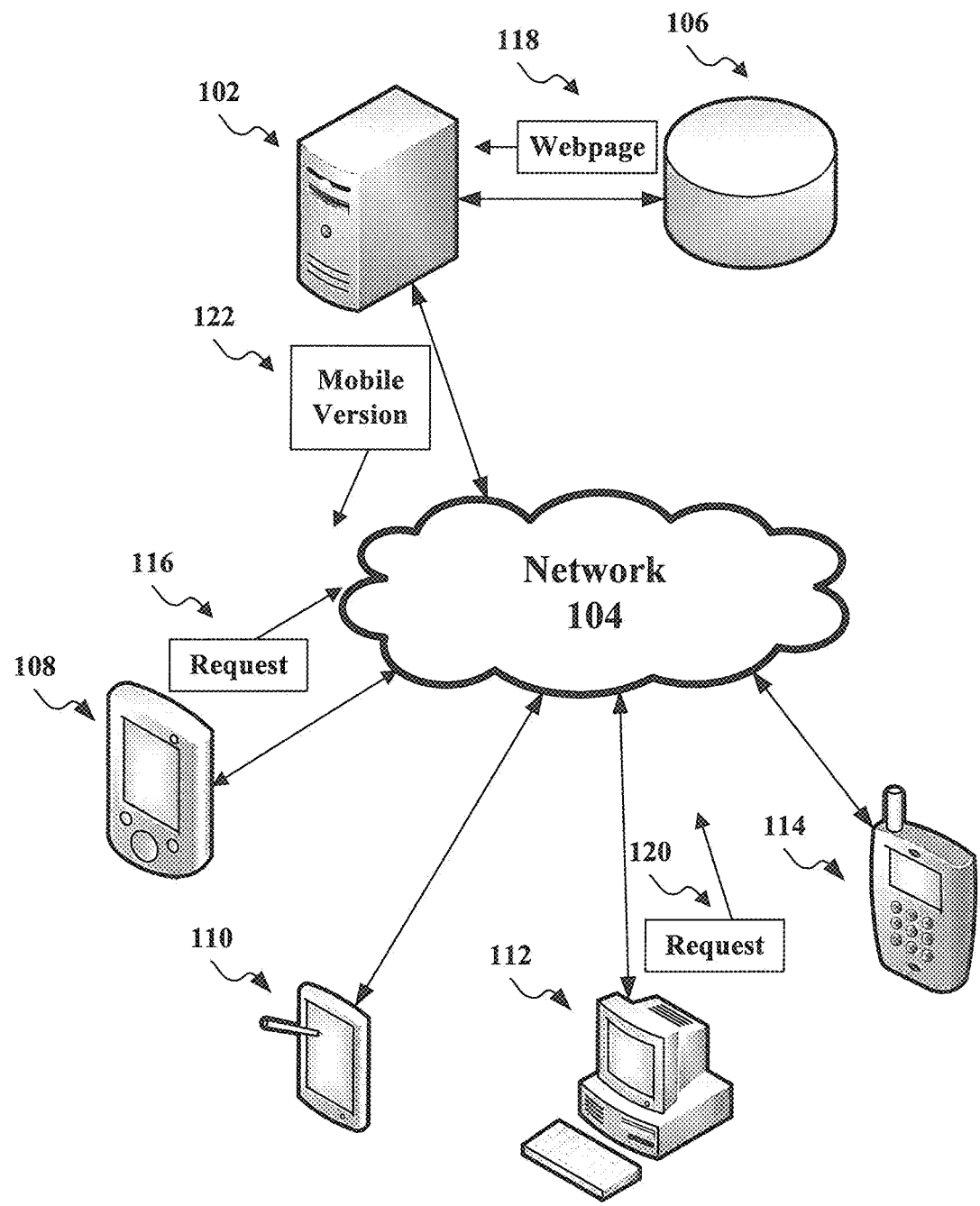
FIG. 1 is a generic block diagram that illustrates an example of a network environment including a server computer, according to various embodiments.

FIG. 1 illustrates a network environment 100 in which a server computer 102 can provide content, such as webpage, that is tailored for the device requesting the content. While FIG. 1 illustrates various components contained in the network environment 100, one skilled in the art will realize that FIG. 1 is one example of a network environment and that additional components can be added and existing components can be removed.

As illustrated, the network environment 100 can include the server computer 102 that is configured to provide content to one or more computing device via a network 104. The server computer 102 can be any type of computing device that includes hardware, such as one or more processors, memory (e.g. volatile and non-volatile memory), computer readable storage media (e.g. hard disk drives, optical disks, solid state drives, etc.), network hardware, input and output devices, and the like. Likewise, the server computer 102 can include software that is configured to receive requests for content and to provide the content via the network 104. The content provided by the server computer 102 can be any type of data that is capable of being transmitted via the network 104, such as webpages, data files, streaming data, and the like. While FIG. 1 illustrates a single computing device for the server computer 102, the server computer 102 can include multiple computing devices operating in conjunction to provide the content via the network 104.

The server computer 102 can be coupled to a repository 106. The repository 106 can be configured to store the content provided by the server computer 102. The repository 106 can be embodied and stored on any type of computer readable storage media. While FIG. 1 illustrates a single repository for the repository 106, the repository 106 can include any number of repositories that are configured to operate in conjunction to store the content provided by the server computer 102. Likewise, while FIG. 1 illustrates the repository being separate from the server computer 102, the repository 106 can be located within the server computer 102.

The network 104 can be any type of network, whether a local area or wide area network, such as the Internet. The network 104 can include any type of network hardware, whether wired or wireless. While FIG. 1 illustrates a single network for the network 104, the network 104 can include any number of connected networks.

The network environment 100 can also include a number of computing devices that can request content from the server computer 102. As illustrated, the network environment 100 can include a smart cellular telephone ("smart phone") 108, a tablet computer 110, a desktop computer 112, and a cellular telephone ("cellphone") 114. The smartphone 108, the tablet computing device 110, the desktop computing device 112, and the cellphone 114 can include hardware, such as one or more processors, memory (e.g. volatile and non-volatile memory), computer readable storage media (e.g. hard disk drives, optical disks, solid state drives, etc.), network hardware, input and output devices, and the like. Likewise, the smartphone 108, the tablet computer 110, the desktop computer 112, and the cellphone 114 can include software that allows the devices to communicate with the server computer 102 via the network 104, such as web browsers, media file players, email clients, file transfer applications, and the like. While FIG. 1 illustrates several examples of computing devices that can request and receive content from the server computer 102, the network environment 100 can include any number and type of computing devices.

In embodiments, the server computer 102 can be configured to provide content to the smartphone 108, the tablet computer 110, the desktop computer 112, and the cellphone 114 that is tailored for the specific device that requests the content. The server computer 102 can maintain, in the repository 106, content that is designed for computing devices that have a display with a normal-sized viewing area, for example, the desktop computer 112, which can include a monitor. When a request for content is received, the server computer 102 can be configured to identify the type of computing device making the request, e.g. whether the device is the smartphone 108, the tablet computer 110, the desktop computer 112, and the cellphone 114, and to identify whether the computing device has a display with limited viewing area.

In embodiments, if the server computer 102 identifies a computing device with limited viewing area (e.g. the smartphone 108, the tablet computer 110, or the cellphone 114), the server computer 102 can be configured to automatically generate a mobile version of the content requested by the computing device. The server computer 102 can be configured to automatically generate the mobile version by identifying known features in the content and modifying the known features so that they are compatible with the display with limited viewing area. The known features can include widgets, information bars and windows, tables, menus, dimensions of the content, dimensions of embedded content such as files and images or any other known features typically found in the content. The server computer 102 can be configured to reformat the known features so that they are compatible with a display of limited viewing area, while maintaining the information and content contained in the known features. Once generated, the server computer 102 can be configured to provide the mobile version to the requesting computing device.

Figure 2:
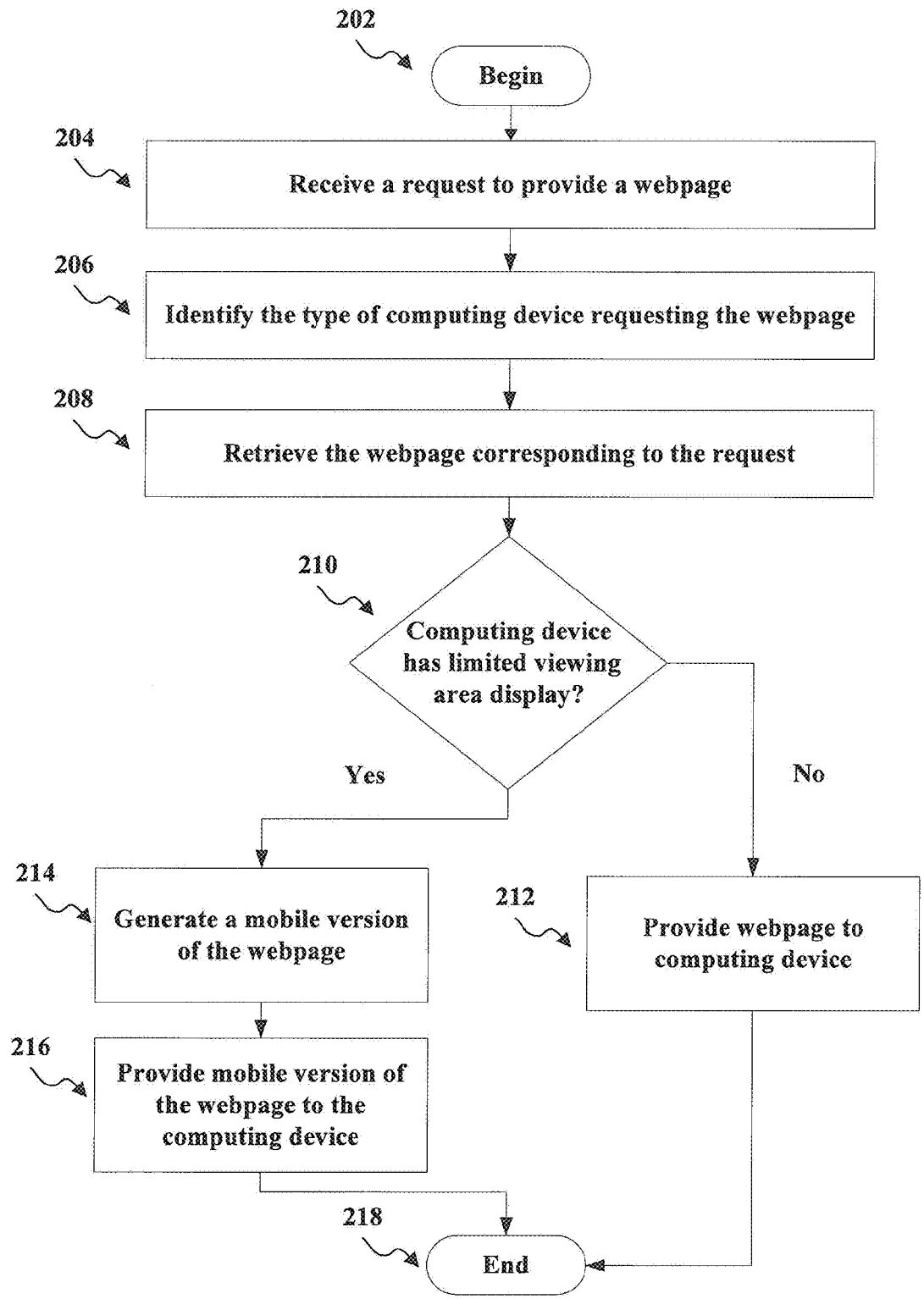
FIG. 2 is flow diagram that illustrates an example of a process for generation of content for computing devices, which have displays of limiting viewing area, according to various embodiments.

FIG. 2 illustrates an example of a process that can be performed by the server computer 102 to provide content, specifically webpage, to computing devices, according to various embodiments. While FIG. 2 illustrates various processes that can be performed by the server computer 102, one skilled in the art will realize that any of the processes and stages of the processes can be performed by any type of computing device that provides content to other computing devices. Likewise, one skilled in the art will realize that the illustrated stages of the processes are examples of the processes that can be performed by the server computer 102 and that any of the illustrated stages can be removed, additional stages can be added, and the order of the illustrated stages can be changed.

In 202, the process can begin. In 204, the server computer 102 can receive a request to provide a webpage. For example, the smart phone 108 can send a request 116 to the server computer 102. The request 116 can identify the webpage that the smart phone 108 desires to receive and view. For instance, the request 116 can be in the form a hypertext transfer protocol request (HTTP) for the webpage that includes a Universal Resource Locator (URL) that identifies the webpage requested by the smart phone 108.

In 206, the server computer 102 can identify a type of the computing device requesting the webpage. For example, if the smart phone 108 provides the request 116, the server computer 102 can examine the request 116 to identify that the smart phone 108 provided the request 116 and that the smart phone 108 includes a display with limited viewing area. For instance, if the request 116 is a HTTP request, the server computer 102 can utilize information contained in the HTTP request to determine the type of smart phone 108. Typically, the HTTP request includes a header (User-Agent string) that identifies the software program providing the HTTP request and information about the computing device on which the software program operates. For example, the User-Agent string can take the form: [software program name]/[version] ([system and browser information]) [platform] ([platform details]) [extensions]. The server computer 102 can parse the User-Agent string to identify the software program and the details on the platform (i.e. the computing device providing the HTTP request). Using the platform details, the server computer 102 can identify that the smart phone 108 is requesting the webpage. When the smart phone 108 is identified, the server computer 102 can identify that smart phones typically have displays with limited view area.

In 208, the server computer 102 can retrieve the webpage corresponding to the request. For example, the server computer 102 can examine the request 116 to determine a webpage 118 to retrieve from the repository 106. For instance, if the request 116 is an HTTP request, the server computer 102 can utilize the URL contained in the HTTP request to identify the webpage 118 stored in the repository 106. Once identified, the server computer 102 can retrieve the webpage 118 from the repository 106.

In 210, the server computer 102 can determine whether to provide the webpage as retrieved or generate a mobile version that is compatible with computing devices, which has a display with limited viewing area. If the computing device that requests the webpage does not have a display with a limited viewing area, in 212, the server computer 102 can provide the webpage 118 to the computing device requesting the webpage 118 retrieved from the repository 106. For example, if the desktop computer 112 requests the webpage 118 in a request 120, the server computer 102 can provide the webpage 118 to the desktop computer 112 without modification.

If the computing device is determined to have a display with limited viewing area, in 214, the server computer 102 can generate a mobile version of the webpage. For example, the server computer 102 can render the webpage 118 to be optimized for the smart phone 108, which can have a display with limited viewing area. The server computer 102 can identify and modify different known features of the webpage 118 to generate a mobile version 122 of the webpage 118. The known features can include widgets, information bars and windows, tables, menus, dimensions of the content, dimensions of embedded content such as files and images or any other known features typically found in the content. The server computer 102 can be configured to reformat the known features so that they are compatible with a display of limited viewing area. The mobile version 122 can be optimized for display within the limited viewing area while maintaining all the content contained in the features.

For example, the server computer 102 can modify a sidebar features within the webpage 118. The server computer 102 can modify the sidebar features to collapse when the display is orientated vertically, and expand when the display is oriented horizontally. Additionally, the server computer 102 can modify the sidebar to include a bar that runs down the side of it with an arrow. When the bar is tapped, the sidebar can be modified to expand and collapse manually.

Additional, for example, the server computer 102 can modify horizontal navigation features (e.g., tabs at the top of the page). When viewed by a device, which has a display with a normal-sized viewing area, the horizontal navigation features trigger drop-down menus when "moused-over." Additionally, because computing devices, which have a display with limited viewing area (e.g. the smart phone 108), typically do not support "mouse over" behavior, the server computer 102 can modify the horizontal navigation features to drop down on a tap, and go to the webpage on the second tap.

Further, for example, the server computer 102 can modify column features. The webpage 118 can utilize "multi-column" layouts, meaning there are 2 or 3 columns of content side-by-side. For computing devices, which have display with limited viewing area, because horizontal space is limited, the server computing 102 can modify the webpages to "stack" the columns vertically to put the content "on rails", meaning the content only scrolls vertically and renders so it's not "squished" horizontally. Additional for example, the server computer 102 can modify auto gadget, embed, and image features. For the webpage 118, these features are adjusted by hand for the user or use default sizes. When generating the mobile version 122, the server computer 102 can modify the webpage 118 so that the embeddings are resized to not "overflow" the page horizontally, for instance, images are changed to have maximum sizes, and gadgets/embeds have maximum widths.

Additionally, for example, the server computer 102 can modify customizable Footer/Header features. When the mobile version 122 is generated, the server computer 102 can modify the webpage 118 so that the page header reorganizes the title, logo, search box, and other elements vertically, to adapt for viewing from a narrow display.

Figure 3:
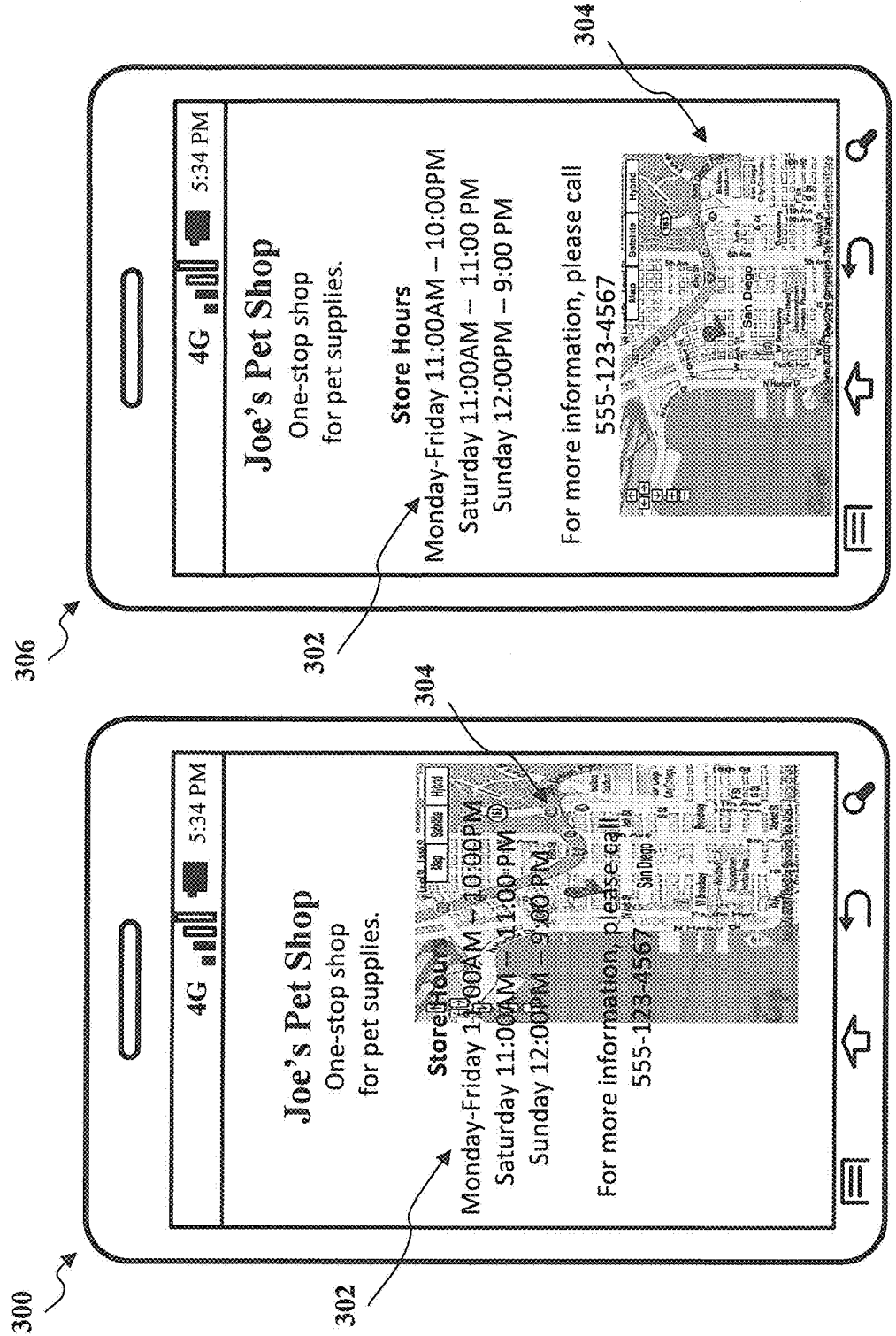
FIGS. 3A and 3B are screenshots of an example of content generated by the server computer, according to various embodiments.

FIGS. 3A and 3B illustrate one example of a mobile version of a webpage generated from a webpage by the server computer 102, according to embodiments. As illustrated in FIG. 3A, the server computer 102 can maintain a webpage 300 that is designed for viewing on a desktop display. The webpage 300 includes a column 302 containing information about a business. The webpage 300 can also include a column 304 that is horizontally positioned next to the column 302 and that contains a map to the location of the business. As illustrated in FIG. 3A, if the webpage 300 is viewed on a computing device, which has a display with limited viewing area, the column 302 and the column 304 can run together. Accordingly, when requested by a computing device, which has a display with limited viewing area, the server computer 102 can automatically generate a mobile version 306 of the webpage 300. As illustrated in FIG. 3B, the server computer 102 can modify the webpage 300 so that the column 302 and the column 304 are stacked vertically. As such, the mobile version 306 can be displayed properly on a display with limited viewing area.

In 216, the server computer 102 can provide the mobile version of the webpage to the computing device that requested the webpage. For example, the server computer 102 can provide the mobile version 122 to the smart phone 108. In 218, the process can end, return to any point or repeat.

While the process is described above for a webpage, the server computer 102 can utilize the process above to provide a mobile version of any type of content maintained by the server computer 102.

In embodiments, the computing devices can request to be provided the original version of the content instead of the mobile version of the content. Once the computing device has requested to receive the original version of particular content, the server computer 102 can be configured to provide only the original version of the content until the computing device requests to receive the mobile version. To provide the correct version after the computing device requests the original version, the server computer 102 can be configured to store an indication that uniquely identifies the computing device and the content. The indication can be any type of identifier that uniquely identifies the computing device and the content.

For example, if the smart phone 108 requests the webpage 118, the smart phone 108 can request to receive the webpage 118 instead of the mobile version 122. To identify the preferred version, the server computer 102 can store an indication that uniquely identifies the smart phone 108 and the webpage 118. For instance, the server computer 102 can store a session cookie that identifies the smart phone 108 and the webpage 118. The session cookie can be based on the path parameter for the webpage so that the request to view the original version is uniquely associated with the webpage 118 and not other webpages that can be in the same or different domains.

In embodiments, the server computer 400 can be configured to allow owners and/or administrators of the content, which is stored in the repository 106, to select the automatic generation of the mobile version. For example, during the creation or establishment of the content or any time thereafter, the server computer 102 can present the owner and/or administrator with an option to enable generation of the mobile version. For example, the server computer 102 can present the owner and/or administrator with a graphical user interface (GUI) or other interface that includes a check-box widget and/or selection widget to enable generation of the mobile version. After the generation is selected, the server computer 102 can automatically generate and provide the mobile version if a computing device, which has a display of limited viewing area, is detected.

Additionally, the server computer 102 can be configured to allow the owner and/or administrator to select which features will be modified in the mobile version. For example, the server computer 102 can present the owner and/or administrator with a GUI or other interface that includes a list of features that can be modified in the mobile version and allows the owner and/or administrator to select the features to be modified in the mobile version. Additionally, the server computer 102 can be configured to generate and provide a preview of the mobile version of the content to an owner and/or administrator of the content stored in the repository 106.

Figure 4:
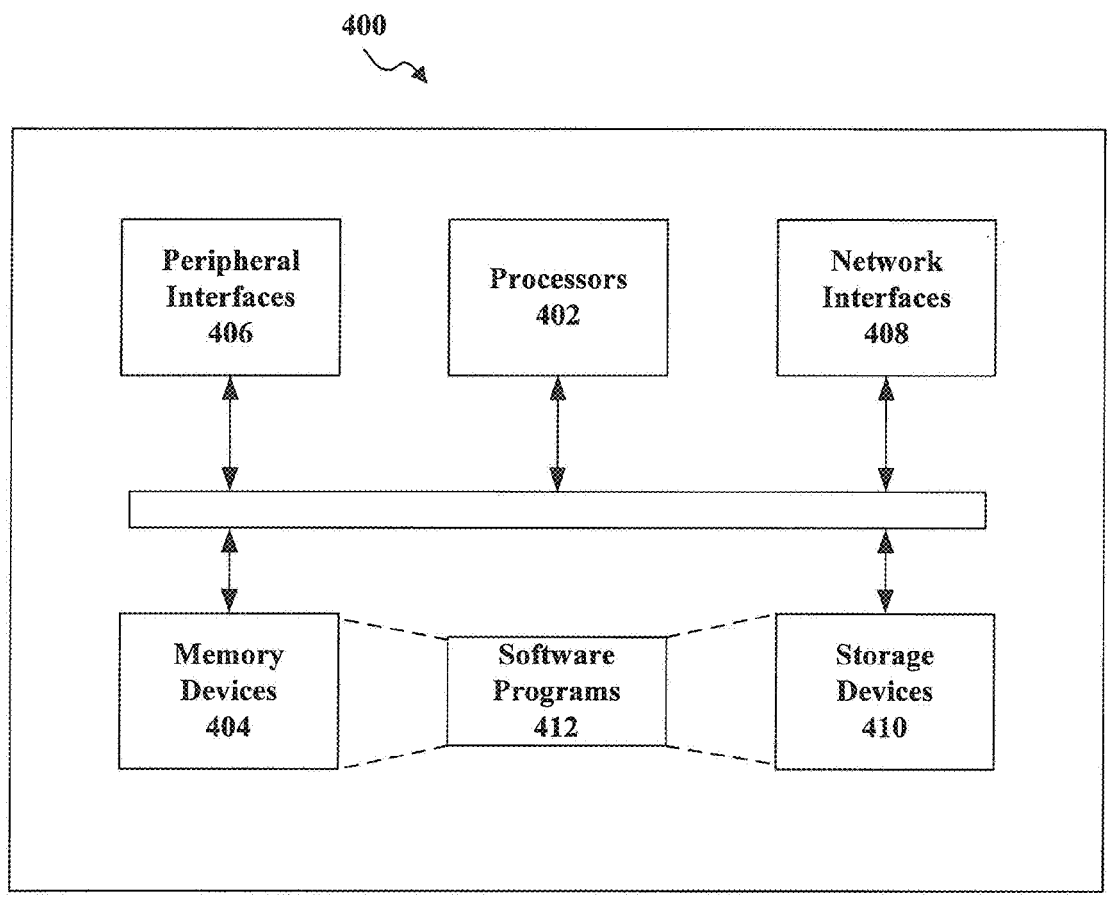
FIG. 4 is a block diagram of an example of a computing device, according to various embodiments.

FIG. 4 is a diagram depicting an exemplary hardware configuration for a computing device 400, such as the server computer 102, that can be used to perform one or more of the processes described above. While FIG. 4 illustrates various components contained in the computing device 400, one skilled in the art will realize that FIG. 4 is one example of a computing device and that additional components can be added and existing components can be removed.

As illustrated in FIG. 4, the computing device 400 can include one or more processors 402 of varying core configurations and clock frequencies. The computing device 400 can also include one or more memory devices 404 that serve as a main memory during the operation of the computing device 400. The computing device 400 can also include one or more peripheral interfaces 406, such as keyboards, mice, touchpads, computer screens, touchscreens, etc., for enabling human interaction with and manipulation of the computing device 400.

The computing device 400 can also include one or more network interfaces 408 for communicating via one or more networks, such as Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc. The computing device 400 can also include one or more storage device 410 of varying physical dimensions and storage capacities, such as flash drives, hard drives, random access memory, etc., for storing data, such as images, files, and program instructions for execution by the one or more processors 402.

Additionally, the computing device 400 can include one or more software programs 412. The one or more software programs 412 can include instructions that cause the one or more processors 402 to perform the processes described. The one or more software programs can be stored in the one or more memory devices 404 and/or on in the one or more storage devices 410.

In embodiments, the components of the computing device 400 need not be enclosed within a single enclosure or even located in close proximity to one another. Those skilled in the art will appreciate that the above-described componentry are examples only, as the computing device 400 can include any type of hardware componentry, including any necessary accompanying firmware or software, for performing the disclosed embodiments. The computing device 400 can also be implemented in part or in whole by electronic circuit components or processors, such as application-specific integrated circuits (ASICs) or field-programmable gate arrays (FPGAs).

Certain embodiments described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method, comprising:
responsive to receiving, at a computer, from a mobile computing device, a request to provide a webpage maintained by a server computer:
identifying, by the computer, from the request, that the mobile computing device includes a display with limited viewing area for displaying the webpage maintained by the server computer;
identifying, by the computer, a predefined feature contained in the webpage maintained by the server computer that would not properly function on the mobile computing device, the predefined feature comprising a drop-down menu configured to drop down in response to a mouse-over;
generating, by the computer, a mobile version of the webpage maintained by the server computer, that includes a modified version of the predefined feature configured to function properly on the mobile computing device, wherein the generating comprises modifying the drop-down menu to drop down in response to a tap gesture from a user of the mobile computing device, and wherein the mobile version of the webpage maintained by the server computer retains the content contained in the webpage maintained by the server computer; and
providing the mobile version of the webpage, with the modified version of the predefined feature, to the mobile computing device for display on the mobile computing device.

2. The method of claim 1, wherein the predefined feature is one of a set of predefined features contained in webpages maintained by the server computer.

3. The method of claim 1, the method further comprising:
identifying, by the computer, prior to generating the mobile version of the webpage, whether a user associated with the webpage has designated the mobile version of the webpage to be generated for the mobile computing device which includes the display with the limited viewing area.

4. The method of claim 3, wherein the user designates generation of the mobile version with a single action.

5. The method of claim 1, the method further comprising:
receiving, at the computer, from the mobile computing device, a request to provide the original version of the webpage;
providing, by the computer, an original version of the webpage to the mobile computing device; and
storing, by the computer, an indication to provide the original version of the webpage in response to future requests for the webpage.

6. The method of claim 5, wherein the indication is a session cookie based on a path parameter.

7. A system, comprising:
one or more processors; and
a memory coupled to the one or more processors, storing instructions that, when executed by the one or more processors, cause the system to perform a method comprising:
responsive to receiving, from a mobile computing device, a request to provide a webpage maintained by a server computer:
identifying, from the request, that the mobile computing device includes a display with limited viewing area for displaying the webpage maintained by the server computer;
identifying at least one predefined feature contained in the webpage maintained by the server computer that would not function properly on the mobile computing device, the at least one predefined feature comprising a sidebar feature;
generating a mobile version of the webpage that includes a modified version of the at least one predefined feature configured to function properly on the display of the mobile computing device, wherein the generating comprises modifying the sidebar feature to expand, as displayed on the display of the mobile computing device, when the display of the mobile computing device is oriented horizontally, and wherein the mobile version of the webpage maintained by the server computer retains the content contained in the webpage maintained by the server computer; and
providing the mobile version of the webpage, with the modified version of the at least one predefined feature, to the mobile computing device for display on the mobile computing device.

8. The method of claim 1, wherein the computer is the server computer.

9. The system of claim 7, wherein the at least one predefined feature contained in the webpage maintained by the server computer further comprises a sidebar feature and generating the mobile version of the webpage maintained by the server computer comprises modifying the sidebar feature to collapse, as displayed on the display of the mobile computing device, when the display of the mobile computing device is oriented vertically.

10. The system of claim 7, wherein the at least one predefined feature is one of a set of predefined features contained in webpages maintained by the system.

11. The system of claim 7, wherein the method further comprises:
  identifying, prior to generating the mobile version of the webpage, whether a user associated with the webpage has designated the mobile version of the webpage to be generated for the mobile computing device which includes the display with the limited viewing area.

12. The system of claim 11, wherein the user designates generation of the mobile version with a single action.

13. The system of claim 7, wherein the method further comprises:
  receiving, from the mobile computing device, a request to provide an original version of the webpage;
  providing the original version of the webpage to the mobile computing device; and
  storing an indication to provide the original version of the webpage in response to future requests for the webpage.

14. The system of claim 13, wherein the indication is a session cookie based on a path parameter.

15. The system of claim 7, wherein the server computer comprises the one or more processors and the memory.

16. A non-transitory computer readable storage medium storing instructions that, when executed by one or more processors, cause a computer to perform a method comprising:
  responsive to receiving, from a mobile computing device, a request to provide a webpage maintained by a server computer:
    identifying, from the request, that the mobile computing device includes a display with limited viewing area for displaying the webpage maintained by the server computer;
    identifying a predefined feature contained in the webpage maintained by the server computer that would not function properly on the mobile computing device, the predefined feature comprising a drop-down menu configured to drop down in response to a mouse-over;
    generating a mobile version of the webpage that includes a modified version of the predefined feature configured to function properly on the mobile computing device, wherein the generating comprises modifying the drop-down menu to drop down in response to a tap gesture from a user of the mobile computing device, and wherein the mobile version of the webpage maintained by the server computer retains the content contained in the webpage maintained by the server computer; and
    providing the mobile version of the webpage, with the modified version of the interactive feature, to the mobile computing device for display on the mobile computing device.

17. The non-transitory computer readable storage medium of claim 16, wherein the predefined feature is one of a set of predefined interactive features contained in webpages maintained by the server computer.

18. The non-transitory computer readable storage medium of claim 16, the method further comprising identifying, prior to generating the mobile version of the webpage, whether a user associated with the webpage has designated the mobile version of the web page to be generated for the mobile computing device which includes the display with the limited viewing area.

19. The non-transitory computer readable storage medium of claim 18, wherein the user designates definition generation of the mobile version with a single action.

20. The non-transitory computer readable storage medium of claim 16, the method further comprising:
  receiving, from the mobile computing device, a request to provide an original version of the webpage;
  providing the original version of the webpage to the mobile computing device; and
  storing an indication to provide the original version of the webpage in response to future requests for the webpage.

21. The non-transitory computer readable storage medium of claim 20, wherein the indication is a session cookie based on a path parameter.

22. The non-transitory computer readable storage medium of claim 16, wherein the computer is the server computer.

* * * * *